Patented June 27, 1950

2,512,660

UNITED STATES PATENT OFFICE 2,512,660

PRODUCTION OF PYRIDINE DERIVATIVE

John E. Mahan, Bartlesville, Okla., assignor to Phillips Petroleum Company, a corporation of Delaware No Drawing. Application March 7, 1946, Serial No. 652,782

16 Claims. (Cl. 260—297)

This invention relates to a process for the production of a pyridine derivative containing a $CH_2=C<$ group attached to a carbon atom in the pyridine nucleus. In one of its more specific aspects, it relates to a process for the production of vinylpyridine and its homologues. This invention is particularly applicable to the production of 2-vinylpyridine from 2-picoline.

Pyridine derivatives containing a $CH_2=C<$ group attached to a carbon atom of the pyridine nucleus have many potential uses and would find wide application if readily available. Important among these are their uses as comonomers in polymerization processes. In the particular case of 2-vinylpyridine, its copolymer with butadiene has shown definite promise in the field of synthetic rubber operations. The extension of its use in this important area demands a process for the quantity production of vinylpyridines by an efficient and economical process. Other potential uses include the production of high molecular weight polymers and copolymers of a resinous nature, compounds which might serve as plasticizers, and the like.

Vinylpyridines also have potential uses in the production of nitrogen-containing pharmaceuticals, as intermediates in the synthesis of organic dyestuffs, as bases for the production of useful organic chemicals, and other uses which will be apparent to one skilled in the art.

The production of 2-vinylpyridine by condensation of formaldehyde and 2-picoline to form monomethylol-2-picoline and subsequent dehydration of this product is known in the art. As practiced heretofore, the condensation of 2-picoline and formaldehyde is effected non-catalytically and the dehydration of monomethylol-2-picoline accomplished by heating, without a catalyst. The dehydration reaction is accompanied by undesirable polymerization reactions which produce a heavy tarry product with a low yield of 2-vinylpyridine. The reaction proceeds in the following manner:

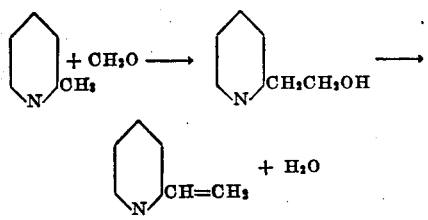

Another disadvantage of this process is the formation of higher condensation products, dimethylol-2-picoline (I) and trimethylol-2-picoline (II), which reduce the yield of monomethylol-2-picoline and subsequently of 2-vinylpyridine.

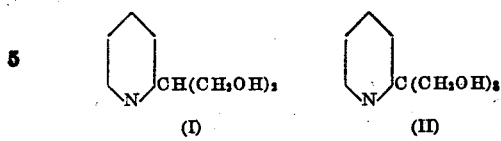

dine. The loss due to formation of these byproducts is large, amounting to as much as 70 per cent of the theoretical yield under some conditions. Obviously the production of 2-vinylpyridine by this method is inefficient and expensive.

Homologues of vinylpyridine, i. e., alkyl substituted vinylpyridines, may be produced in a similar manner. As an example, 2-methyl-5-ethylpyridine may be converted to 2-vinyl-5-ethylpyridine by formation of the monomethylol derivative and subsequent dehydration to 2-vinyl-5-ethylpyridine. This reaction proceeds as follows:

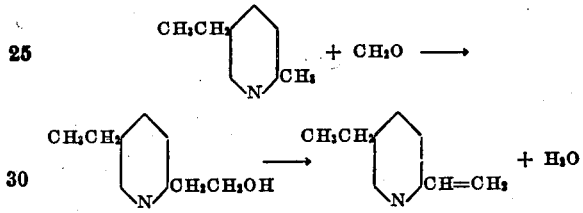

Other homologues of vinylpyridine may be produced in an analogous manner.

The reaction of formaldehyde with an alkyl substituted pyridine with the addition of the hydroxymethyl group is known to take place in those instances in which an alkyl group is in the 2-, 4-, or 6-position of the pyridine ring. The addition does not take place on alkyl groups in the 3- or 5-positions. The pyridine nucleus may contain other substituents, as, for example, chloro or cyano groups, which do not interfere with the addition of the hydroxymethyl group to the alkyl radical. It is often desirable to employ an alkyl substituted pyridine containing a chloro or cyano group attached to a carbon atom in the pyridine nucleus in the process of the present invention.

I have found that pyridine derivatives containing a $CH_2=C<$ group attached to a carbon atom in the pyridine nucleus can be produced economically and efficiently by the reaction of an alkyl substituted pyridine with formaldehyde to form a hydroxyalkyl substituted pyridine derivative and dehydration of the hydroxyalkylpyridine derivative to the corresponding pyridine derivative containing a CH₂=C< group. In the process of the present invention a catalyst is employed for the reaction between formaldehyde and the alkyl substituted pyridine derivative. In my copending application, Serial No. 652,781, filed March 7, 1946, is disclosed a novel process for the catalytic dehydration step, wherein a dehydrating metal oxide catalyst is employed at 400 to 800° F. These discoveries have resulted in greatly improving the yields of pyridine derivatives containing a CH₂=C< group.

The present invention is particularly adapted to the production of 2-vinylpyridine and monomethylol-2-picoline from 2-picoline. I have found that 2-vinylpyridine and monomethylol-2-picoline may be economically and efficiently produced by the process of the present invention using a catalyst to selectively activate the condensation of formaldehyde and 2-picoline to monomethylol-2-picoline substantially without the formation of dimethylol- and trimethylol-picoline. By the process of this invention it is possible to produce 2-vinylpyridine directly from formaldehyde and 2-picoline by subjecting the effluent from the condensation reaction to dehydration which effects conversion of the monomethylol-2-picoline to 2-vinylpyridine. The 2-vinylpyridine is separated and the unchanged monomethylol-2-picoline recycled to the dehydration zone. The process is also suited to the production of 4-vinylpyridine and monomethylol-4-picoline from 4-picoline in an analogous manner.

Obviously, the present invention shows a decided advantage over prior art by making possible high ultimate yields without loss in the formation of higher condensation products. It also has the advantage of increased efficiency by single stage operation and recycling of unchanged reactants.

In one specific embodiment of the present invention, the process comprises reacting a mixture of 2-picoline with formaldehyde in the presence of a selected catalyst. The temperature is maintained at a suitable elevated level and agitation furnished throughout the reaction time. The effluent consists of unchanged reactants and monomethylol-2-picoline. Depending on the operating conditions more or less 2-vinylpyridine may be formed by dehydration of a part of the monomethylol-2-picoline by heat in the reactor. The effluent is subjected to fractional distillation. Formaldehyde, and unchanged 2-picoline as a water azeotrope are first separated and recycled to the reaction zone. Heavy ends consisting partly of resinous polymers of 2-vinylpyridine are formed in small amounts and are also removed from the monomethylol-2-picoline. Formation of these polymers may be kept at a minimum by careful control of reaction and fractionation conditions. Any 2-vinylpyridine formed may be separated at this point if desirable, or it may be passed to the dehydration step with the monomethylol compound.

The preferred catalysts for use in the process of the present invention are relatively non-volatile strong mineral acids, anhydrides of these acids, and acid reacting salts. Phosphoric acid, sulfuric acid, and potassium persulfate are particularly effective. Phosphoric acid and sulfuric acid are preferably employed as concentrated aqueous solutions. The preferred range of concentration for sulfuric acid is 80 to 100 weight per cent and for phosphoric acid, 60 to 100 weight per cent. Acid concentrations of 85 per cent orthophosphoric, and 95 per cent sulfuric are especially suited to the present process. Anhydrides of these acids, e. g. phosphorous pentoxide and sulfur trioxide, and alkali metal strong acid reacting salts of these acids, particularly sodium dihydrogen phosphate and potassium persulfate, are effective catalysts for the condensation reaction. The anhydrides are rapidly diluted with water due to the dehydration reaction. Boron trifluoride and alkali metal fluoborates, e. g. sodium fluoborate and potassium fluoborate, are also effective catalysts for the condensation reaction. I have found that these catalysts give definitely higher per-pass yields of the desired product than do non-catalyzed operations. Orthophosphoric acid and potassium persulfate are entirely selective in their action and when used, no higher condensation products are formed, making possible high ultimate yields with these catalysts. When sulfuric acid is employed, small amounts of dimethylol-2-picoline are found in the effluent. Acetic acid-ammonium acetate, zinc chloride, silica-alumina, and hydrochloric acid have been used in test runs and the results obtained were inferior to non-catalyzed operations. Basic catalysts such as Triton B (a quaternary ammonium hydroxide) seem to promote the condensation of formaldehyde with itself which is a source of operational difficulties.

The formaldehyde may be either in anhydrous form or in an aqueous solution. Dilute aqueous solutions of formaldehyde such as the 37 per cent solution of commerce, are suitable for use in the process of the present invention. Formaldehyde used for this reaction may be added in an aqueous solution, as paraformaldehyde, or as trioxane:

with equally good results. When paraformaldehyde is used, water is added to facilitate separation of unchanged reactants for recycling.

Temperatures employed for the process are in the general range of 200° to 500° F. although 280° to 360° F. will be found most advantageous.

Pressure requirements are not critical. Satisfactory results are obtained in the range from atmospheric pressure to 500 pounds per square inch. Pressure developed within a reactor in heating from atmospheric temperature will be well within this range. Oftentimes initial pressures below 100 pounds per square inch gauge will be found most convenient.

In general, the per pass yields increase as the length of reaction time increases, approaching a maximum of about 70 per cent of theoretical yield at from 12 to 14 hours. Since the increase in yield is slight as the maximum point is approached, I have found most efficient operation can be obtained with reaction times of from two to six hours. Simultaneously with the increase in yield, a decrease in efficiency occurs and generally, economic factors will dictate the most practical reaction period to use in a given case.

The operation of my process is illustrated by the following specific examples.

*Example I*

A steel bomb was charged with three mols of formaldehyde in 37 per cent aqueous solution and five mols of 2-picoline. Five milliliters of 85 per cent orthophosphoric acid was added as a catalyst and air removed by flushing with hydrogen at a pressure of 100 pounds per square inch. The temperature was maintained in the range 300° to 320° F. for three hours. Agitation was furnished throughout the reaction time by means of an electrically driven platform rocker.

The reaction product was treated with one gram of polymerization inhibitor (tertiary butyl catechol) and stripped of water and 2-picoline on a three foot spinning band fractionating column operating at a pressure of 30 mm. until the temperature of the distilling liquid reached 140° F. 2-vinylpyridine and monomethylol-2-picoline were then distilled on a smaller fractionating column at 10 mm. pressure. The 2-vinylpyridine cut was collected at 117° to 124° F. under 10 mm. pressure while the monomethylol-2-picoline cut was collected at 241° to 250° F. under the same pressure.

The final yield consisted of 6.7 mol per cent (based on formaldehyde used) of 2-vinylpyridine and 46.6 mol per cent of monomethylol-2-picoline, or a total conversion of 53.3 mol per cent. No dimethylol- or trimethylol-2-picoline was found. Bottoms consisting of resinous materials amounted to 4.1 per cent by weight based on total weight of reactants.

The product from the catalytic reaction was passed through a dehydrator and converted to 2-vinylpyridine in a continuous flow process with fractionation of the products after separation of the water. Substantially complete recovery as 2-vinylpyridine was accomplished.

*Example II*

The procedure of Example I was repeated using the same reaction materials but employing a catalyst consisting of 6 grams potassium persulfate. Temperature conditions and reaction time were the same as in the previous example. The results are given in the following tabulation:

Yield 2-vinylpyridine (mol per cent based on formaldehyde charged)_____ 7.5
Yield monomethylol-2-picoline_____ 43.5
Combined yield_____ 51.0
Di- and trimethylol-2-picoline_____None
Bottoms (per cent based on weight reactants)_____ 3.3

*Example III*

The condensation of formaldehyde with 2-picoline was effected as in Example I in the presence of 6 grams of 95 per cent sulfuric acid as the catalyst. Temperature conditions were as in the previous examples but the reaction time was extended to eight hours. The following results were obtained:

Yield 2-vinylpyridine (mol per cent based on formaldehyde charged)_____ 31.1
Yield monomethylol-2-picoline (mol per cent based on formaldehyde charged)____ 26.6
Combined yield (mol per cent based on formaldehyde charged) _____ 57.7
Higher condensation products_____ 5.0
Bottoms (weight per cent based on total reactants_____ 6.7

I claim:
1. A process for the production of a pyridine derivative containing a $CH_2=C<$ group attached to a carbon atom in the pyridine nucleus which comprises reacting an alkylpyridine selected from the group consisting of 2-, 4-, and 6-alkylpyridine derivatives with formaldehyde at a temperature within the range of from 200° F. to 500° F. in the presence of small but catalytic amounts of a material selected from the group consisting of relatively non-volatile strong mineral acids, anhydrides of relatively non-volatile strong mineral acids, and acid-reacting salts of relatively non-volatile strong mineral acids, thereby forming the corresponding hydroxyalkyl pyridine, and subjecting the resulting total reaction mixture to sufficient heating to convert said hydroxyalkyl pyridine therein by dehydration reaction to the corresponding pyridine derivative containing a $CH_2=C<$ group.

2. A process for the production of 2-vinylpyridine which comprises reacting 2-picoline with formaldehyde at a temperature within the range of from 200° F. to 500° F. in the presence of small but catalytic amounts of potassium persulfate, thereby forming monomethylol-2-picoline, and subjecting the resulting total reaction mixture to sufficient heating to convert said monomethylol-2-picoline therein by dehydration reaction to 2-vinylpyridine.

3. A process for the production of 2-vinylpyridine which comprises reacting 2-picoline with formaldehyde at a temperature within the range of from 200° F. to 500° F. in the presence of small but catalytic amounts of phosphoric acid, thereby forming monomethylol-2-picoline, and subjecting the resulting total reaction mixture to sufficient heating to convert said monomethylol-2-picoline therein by dehydration reaction to 2-vinylpyridine.

4. A process for the production of 2-vinylpyridine which comprises reacting 2-picoline with formaldehyde at a temperature within the range of from 200° F. to 500° F. in the presence of small but catalytic amounts of sulfuric acid, thereby forming monomethylol-2-picoline, and subjecting the resulting total reaction mixture to sufficient heating to convert said monomethylol-2-picoline therein by dehydration reaction to 2-vinylpyridine.

5. A process for the production of 2-vinylpyridine which comprises reacting 2-picoline with formaldehyde at a temperature within the range of from 200° F. to 500° F. in the presence of small but catalytic amounts of material selected from the group consisting of relatively non-volatile strong mineral acids, anhydrides of relatively non-volatile strong mineral acids, and acid-reacting salts of relatively non-volatile strong mineral acids, thereby forming monomethylol-2-picoline, and subjecting the resulting total reaction mixture to sufficient heating to convert said monomethylol-2-picoline therein by dehydration reaction to 2-vinylpyridine.

6. A process for the production of monomethylol-2-picoline which comprises reacting 2-picoline with formaldehyde at a temperature within the range of from 200° F. to 500° F. in the presence of small but catalytic amounts of potassium persulfate, thereby forming monomethylol-2-picoline.

7. A process for the production of monomethylol-2-picoline which comprises reacting 2-picoline with formaldehyde at a temperature within the range of from 200° F. to 500° F. in the presence of small but catalytic amounts of orthophosphoric acid, thereby forming monomethylol-2-picoline.

8. A process for the production of monomethylol-2-picoline which comprises reacting 2-picoline with formaldehyde at a temperature within the range of from 200° F. to 500° F. in presence of small but catalytic amounts of sulfuric acid, thereby forming monomethylol-2-picoline.

9. A process for the production of monomethylol-2-picoline which comprises reacting 2-picoline with formaldehyde at a temperature within the range of from 280° F. to 360° F. in the presence of small but catalytic amounts of potassium persulfate, thereby forming monomethylol-2-picoline.

10. A process for the production of monomethylol-2-picoline which comprises reacting 2-picoline with formaldehyde at a temperature within the range of 280° F. to 360° F. in the presence of small but catalytic amounts of orthophosphoric acid, thereby forming monomethylol-2-picoline.

11. A process for the production of a vinylpyridine which comprises reacting a picoline selected from the group consisting of 2-picoline and 4-picoline with formaldehyde at a temperature within the range of from 200° F. to 500° F. in the presence of small but catalytic amounts of a relatively non-volatile strong mineral acid catalyst, thereby forming the corresponding monomethylol picoline, and subjecting the resulting total reaction mixture to sufficient heating to convert said monomethylol picoline therein by dehydration reaction to the corresponding vinylpyridine.

12. A process for the production of vinylpyridine which comprises reacting a picoline selected from the group consisting of 2-picoline and 4-picoline with formaldehyde at a temperature within the range of from 200° F. to 500° F. in the presence of small but catalytic amounts of an acid-reacting salt of a relatively non-volatile strong mineral acid, thereby forming the corresponding monomethylol picoline, and subjecting the resulting total reaction mixture to sufficient heating to convert said monomethylol picoline therein by dehydration reaction to the corresponding vinylpyridine.

13. A process for the production of 2-vinylpyridine which comprises reacting 2-picoline with formaldehyde at a temperature within the range of from 200° F. to 500° F. in the presence of small but catalytic amounts of a relatively non-volatile strong mineral acid catalyst, thereby forming monomethylol-2-picoline, and subjecting the resulting total reaction mixture to sufficient heating to convert said monomethylol-2-picoline therein by dehydration reaction to the corresponding 2-vinylpyridine.

14. A process for the production of monomethylol-2-picoline which comprises reacting 2-picoline with formaldehyde at a temperature within the range of from 200° F. to 500° F. in the presence of small but catalytic amounts of a relatively non-volatile strong mineral acid catalyst, thereby forming monomethylol-2-picoline.

15. A process for the production of monomethylol-2-picoline which comprises reacting 2-picoline with formaldehyde at a temperature within the range of from 200° F. to 500° F. in the presence of small but catalytic amounts of a material selected from the group consisting of relatively non-volatile strong mineral acids, anhydrides of relatively non-volatile strong mineral acids, and acid-reacting salts of relatively non-volatile strong mineral acids, thereby forming monomethylol-2-picoline.

16. A process for the production of a hydroxy alkylpyridine which comprises reacting an alkylpyridine selected from the group consisting of 2-, 4-, and 6-alkylpyridine derivatives with formaldehyde at a temperature within the range of from 200° F. to 500° F. in the presence of small but catalytic amounts of a material selected from the group consisting of relatively non-volatile strong mineral acids, anhydrides of relatively non-volatile strong mineral acids, and acid-reacting salts of relatively non-volatile strong mineral acids, thereby forming the corresponding hydroxy alkylpyridine.

JOHN E. MAHAN.

REFERENCES CITED

The following references are of record in the file of this patent:

Maier; "Das pyridine und seiner derivatives," pages 43, 191, 31.

Annalen, pages 124, 125, and 128, vol. 301 (1898).

Berichte, vol. 23, pages 2709–2713.

Berichte, vol. 22, 1889, pages 2583 and 2584.